US 6,742,633 B1

(12) United States Patent
Sherman, II et al.

(10) Patent No.: US 6,742,633 B1
(45) Date of Patent: Jun. 1, 2004

(54) LINKAGE FOR JOINING A LEVER TO A BRAKE CABLE

(75) Inventors: William Eugene Sherman, II, South Bend, IN (US); Kent Allen Woodiwiss, Goshen, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/323,321

(22) Filed: Dec. 18, 2002

(51) Int. Cl.$^7$ .............................................. F16D 51/00
(52) U.S. Cl. .................... 188/79.64; 188/2 D; 188/325; 74/502.6
(58) Field of Search .............................. 188/79.64, 2 D, 188/78, 79.54, 106 A, 106 F, 325, 331; 74/500.5, 502.4–502.6

(56) References Cited

U.S. PATENT DOCUMENTS

| | | | | |
|---|---|---|---|---|
| 5,174,170 A | * | 12/1992 | Kato et al. .................. | 74/502.6 |
| 5,180,037 A | * | 1/1993 | Evans ........................ | 188/70 R |
| 5,983,745 A | * | 11/1999 | Petrak ........................ | 74/502.4 |
| 6,234,281 B1 | * | 5/2001 | Sherman et al. ......... | 188/79.64 |

* cited by examiner

Primary Examiner—Pam Rodriguez
(74) Attorney, Agent, or Firm—Leo H. McCormick, Jr.; Warren Comstock

(57) ABSTRACT

A linkage for connecting a brake cable to an actuator lever in a drum-in-hat park brake assembly. The linkage is defined by a continuous wire that is shaped into a base with parallel and adjacent first and second legs located in a first plane perpendicular to the base and parallel and adjacent third and fourth legs located in a second plane perpendicular to the base. The first and second legs each have a first section that extend a first distance from the base to a first loop and a second section that extend a second distance from the first loop to a second loop while the third and fourth legs extend a third distance from the base. The base has an opening defined by a complementary shape created between the first leg and the third leg and the second leg and the fourth leg. The base receives a head member on a cable after the head is passed through the first loop and a force is applied to the cable to expand the first section of the first and second legs to allow the cable to be located in the opening in the base. Actuation forces are applied to a brake lever and transmitted to move the actuator lever that in turn moves first and second brake shoes into engagement with a drum to effect a brake application.

9 Claims, 3 Drawing Sheets

LINKAGE FOR JOINING A LEVER TO A BRAKE CABLE

This invention relates to a linkage for connecting a brake cable to an actuator in a drum-in-hat park brake.

BACKGROUND OF THE INVENTION

In a vehicle having four wheel disc brakes overall cost saving may be achieved through the use of a drum-in-hat parking brake such as disclosed in U.S. Pat. No. 5,180,037 as many of the structural components for a conventional service brake may be used in a parking brake. In a study of parking brakes, it was summarized that less than twenty five percent of drivers effect a parking brake application on a regular basis and the use of a parking brake was even less in vehicles having an automatic transmission. It was found that with such limited use, an initial thickness of the material of friction members for a parking brake remains essentially the same over the life of a vehicle regardless of the relative large coefficient of friction between the friction pads and drum needed to hold a vehicle stationary. Thus, it is common to develop a typical high coefficient of friction for a friction lining for a parking brake from a composition of materials mainly consisting of metal oxides, ceramic particles, carbon particles, fibers and other materials retained in a phenolic matrix. The relative limited wear is not unexpected, as a vehicle is stationary when a parking brake application is applied and as a result frictional wear normally does not occur. However, current safety standards require a park brake to also be capable of functioning as an emergency brake and have an ability to achieve a minimum of six rolling stops from a speed of 18.6 miles per hour. In order to meet this requirement, it is not uncommon for an actuation force of approximately 100 Kg must be applied to bring brake shoes into engagement with a drum.

It is not uncommon for the drum-in-hat parking brake to be assembled at one place and later installed on a vehicle in another location through a brake cable connection such as disclosed in U.S. Pat. No. 5,174,170 or U.S. patent application Ser. No. 10/171,142 filed Jun. 13, 2002 now U.S. Pat No. 6,651,789. Since it may be difficult and time consuming to install a brake cable to the actuator on an assembly line as such assembly is essentially a blind entry, it has been suggested that a stub linkage be provided with a drum-in-hat assembly the end thereof later joined to a brake cable by a crimp connection. Unfortunately the stub linkage and crimp connection can add cost of the overall brake assembly and as a result customers would prefer a different solution to this situation.

SUMMARY OF THE INVENTION

A primary object of the present invention is to provide a low cost linkage for joining a brake cable to an actuator in a drum-in-hat park brake.

According to this invention, a drum-in-hat park brake assembly for a vehicle has a first brake shoe and a second brake shoe that are respectively retained on a backing plate secured to a vehicle. The first brake shoe and the second brake shoe each have a first web with a first engagement end and a second engagement end. The first engagement end of each of the first and second webs is aligned with an anchor secured to the vehicle while the second engagement end of each of the first and second webs is spaced apart by an actuator assembly. First and second springs are attached to the first and second webs and urge the first and second webs toward the anchor and an actuator assembly. The actuator assembly upon receiving an actuation force acts on the first engagement ends to move the first and second friction members associated with the first and second brake shoes into engagement with a drum to effect a brake application. The actuator assembly is characterized by a housing with a first end that engages the first web and a second end that engages the second web and a lever that is pivotally retained in the housing. The lever has a first end that engages the first web and a second end with a hook thereon that is connected to an actuation cable by a linkage that is formed from a substantially continuous wire. The linkage is defined a base with parallel and adjacent first and second legs that are located in a first plane perpendicular to the base and parallel and adjacent third and fourth legs that are located in a second plane perpendicular to the base. The first and second legs each have a first section that extend a first distance from the base to a first loop and a second section that extend a second distance from the first loop to a second loop while the third and fourth legs each extend a third distance from the base. The base has an opening defined by a complementary shape between the first leg and the third leg and the second leg and the fourth leg. The base receives a head member on a cable after the head passes through the first loop and a force is applied to the cable to expand the first section and allow the cable to be located in the opening and the head to be positioned between the first and second legs and the third and fourth legs. An actuation force is communicated through the head and communicated through the first and second legs by the second loop pulling on the lever to move the first and second brake pads into engagement with a drum and effect a brake application.

An advantage of this invention resides in a simple wire formed linkage for joining a brake cable with a lever in an actuator for a drum-in-hat brake assembly.

BRIEF DESCRIPTION OF THE DRAWINGS

FIG. 6a and 6b are views of a means for joining the ends of parallel legs of the linkage together.

DETAILED DESCRIPTION

Figure 1:
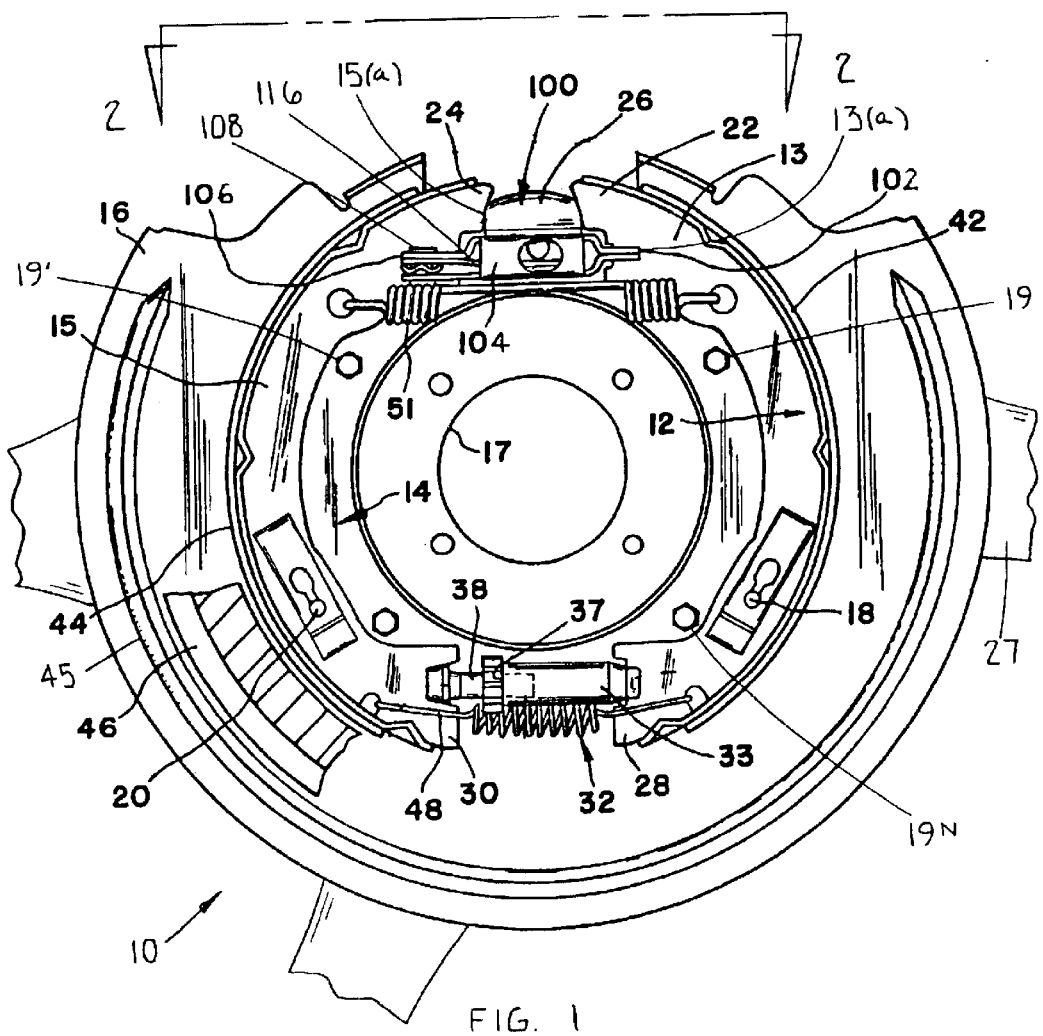
FIG. 1 is a schematic illustration of a drum-in-hat brake for a vehicle.
Figure 2:
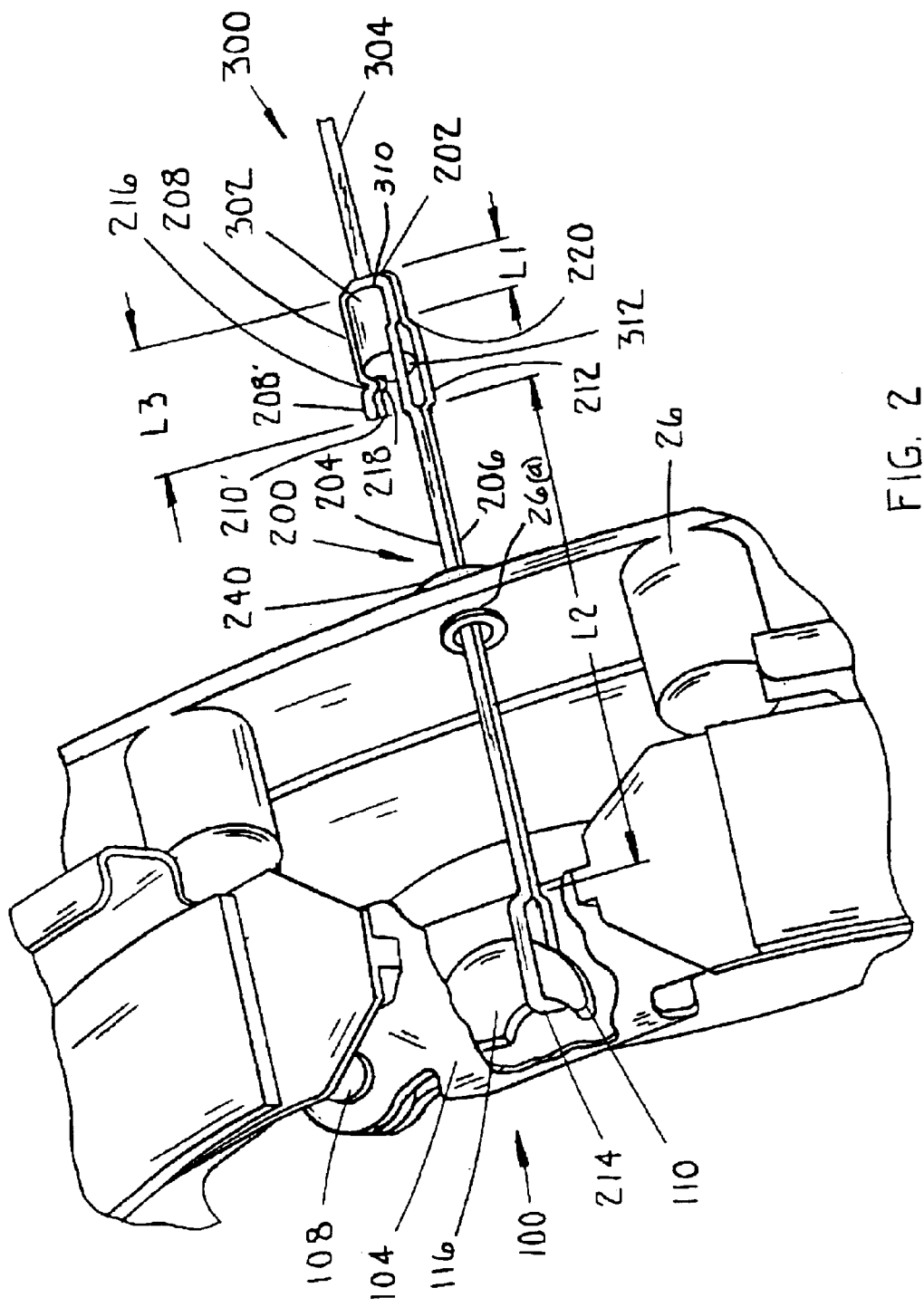
FIG. 2 is an enlarged sectional view taken along lines 2—2 of FIG. 1 showing a linkage, made according to the principles of the present invention, for connecting a brake cable to a lever of an actuator to provide an input force for moving first and second brake shoes into engagement with a drum to effect a brake application.

The drum-in-hat brake 10 shown in FIGS. 1 for use in a vehicle is known in the prior art for use in effecting a parking brake application. The drum-in-hat brake 10 is of a type illustrated in U.S. Pat. No. 6,234,281 and includes a backing plate 16 that is fixed by bolts 19, 19' . . . 19" to a vehicle. The backing plate 16 has an opening 17 therein through which an axle shaft of the vehicle passes with first 12 and second 14 brake shoes retained in radial alignment on the backing plate 16 by first 18 and second 20 pins that are secured to the backing plate 16. Brake shoe 12 has a first end 22 and brake shoe 14 has a first end 24 that, respectively, contact an anchor block 26 attached to the vehicle that extends through the backing plate 16. Further, brake shoe 12 has a second end 28 and brake shoe 14 has a second end 30 that, respectively, contact an adjuster strut mechanism 32. The strut mechanism 32 being of a type as illustrated in U.S. Pat. Nos. 4,502,574 and 5,480,010 that links web 13 on brake shoe 12 with web 15 on brake shoe 14 in such a manner that a force experienced on engagement of either brake shoe 12, 14 with drum 46 is directly communicated to the other. During braking, the length of the strut mechanism 32 may be altered by rotating stem 38 and star wheel 37 with respect to cylinder 33 to establish and maintain a predetermined running clearance between a first friction pad 42 on brake shoe 12 and a second friction pad 44 on brake shoe 14 and a drum 46. A resilient arrangement includes: a first spring 51 that is connected to the first 12 and second 14 brake shoes for respectively urging the first ends 22,24 toward the anchor post 26 and a second spring 48 that is also connected to the first 12 and second 14 brake shoes for urging the second ends 28,30 toward the adjuster strut mechanism 32. An actuator mechanism 100, of a type disclosed in U.S. Pat. No. 6,234,281, is located adjacent the anchor post 26. Actuator mechanism 100 includes a housing 104 with first end 102 that engages web 13 and a second end 106 end that engages web 15. Ends 102 and 106 are respectively located on ledges in web 13 and 15 and have a length there between such that when the first ends 22,24 engaging anchor 26, ends 102 and 106 also engage corresponding faces 13a and 15a on webs 13, 15. A lever 116 of actuator mechanism 100, as best shown in FIG. 2, is located in housing 104 by a pin 108. Lever 116 has a cam surface that engages web 15 and a hooked end 110 that is located between the first end 102 and the second end 106 for receiving a loop 214 of a linkage 200 that connects the lever 116 to a park brake actuation cable 300 in the vehicle.

Figure 3:
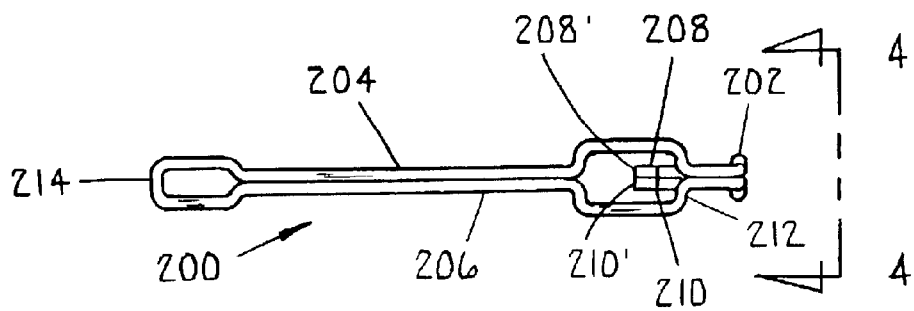
FIG. 3 is a view of the linkage of FIG. 2.
Figure 4:
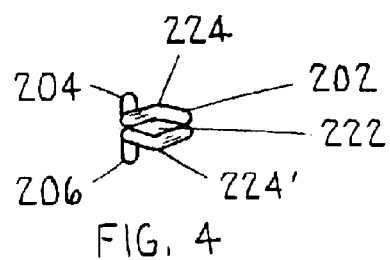
FIG. 4 is a view taken along lines 4—4 of FIG. 3.
Figure 5:
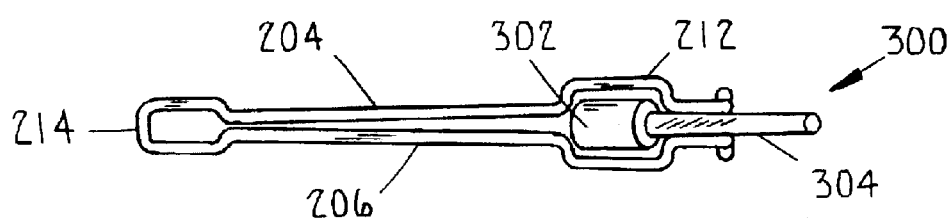
FIG. 5 is view of the linkage of FIG. 2 illustrating a step in joining a brake cable to the linkage.

Linkage 200 as best shown in FIGS. 3, 4 and 5 is formed from substantially continuous steel wire having a tensile strength of 1308 MPa. Linkage 200 is defined a base 202 with parallel and adjacent first 204 and second 206 legs that are located in a first plane perpendicular to base 202 and parallel and adjacent third 208 and fourth 210 legs that are opposite to the first 204 and second 206 legs and located in a second plane perpendicular to base 202. The first 204 and second 206 legs each have a first section that extend a first distance "$L_1$" from base 202 to a first loop 212 formed by complementary bending each leg and a second section that extend a second distance "$L_2$" from the first loop to a second loop 214 formed on the end of the first 204 and 206 legs. The third 208 and fourth 210 legs each extend a third distance "$L_3$" from the base 202 such that ends 208' and 210' are located above a bottom plane for the first loop 212 and in particular a throat 220 formed by the transition of the first 204 and second 206 legs from the first section to the first loop 212. The third leg 208 has a v shaped projection 216 that extends toward the first leg 204 while the fourth leg 210 has a v shaped projection 218 that extends toward the second leg 206. The base 202 as best shown in FIG. 4 has an opening 222 formed by bending the wire between the first leg 204 and the third leg 208 and the wire between the second leg 206 and the fourth leg 210 to define apexes 224,224'_ at the axial center of base 202 defined by a complementary shape.

Figure 6A:
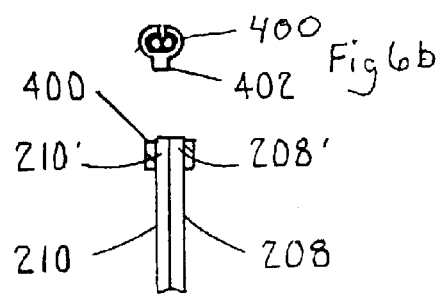
Figure 7:
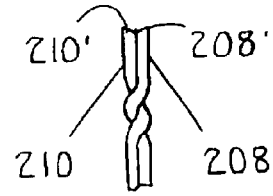
FIG. 7 is a view of another means for joining the ends of parallel legs of the linkage together.

In a preferred embodiment, ends 208' and 210' are joined together by brazing (welding would achieve the same result) to define a unitary structural member for linkage 200. In FIG. 6, the ends 208' and 210' are joined together by placing a clip 400 over the ends with a projection or lip 402 on clip 400 extending toward the first 204 and second 206 legs. In FIG. 7, the ends 208' and 210' are wound around each other to join the third 208 and fourth 210 legs together to form the unitary structural member of linkage 200.

Method of Assembly

The linkage 200 is attached to lever 116 of actuator mechanism 100 in the following manner. A grommet 240 is located on the second section of the parallel and adjacent first 204 and second 206 legs and the second loop 214 thereafter passed through opening 26a in anchor 26 with grommet 240 pushed into opening 26a to restrict the size of the opening and seal the interior of the anchor 26 from the environment. Loop 214 is brought into the interior of housing 100 and connected to the hook end 110 of lever 116. That portion of the first leg 204 and that portion of the second leg 206 that form loop 214 engages a flat surface on the lever 116 while grommet 240 engages the second section of the first 204 and second 206 legs located in length $L_2$ such that linkage 200 is held in a substantially perpendicular plane with respect to lever 116. The attachment of linkage 200 to lever 116 is usually a last step in the assembly of a drum-in-hat brake 10. The drum-in-hat brake 10 is shipped to a vehicle manufacture and attached to a vehicle through bolts 19, 19' . . . 19". Thereafter, the linkage 200 is connected to a park brake actuation cable 300 in the following manner as best shown in FIG. 5.

The park brake actuation cable 300 that includes a cylindrical head 302 that is attached to a stranded cable 304 is actuated to the linkage 200 by passing head 302 through the first loop 212 toward the third 208 and fourth 210 legs to bring the stranded cable 304 into the throat 220 and a force applied thereto such that the first section of the first 204 and second 206 legs resiliently expand and allow the stranded cable 304 to be pulled toward base 202 such that the stranded cable 304 is located in opening 222 and the cylindrical head 302 is aligned between the first 204 and third 208 legs and second 206 and fourth 210 legs with the face 310 of cylindrical head 302 resting on base 202. The projections 216 and 218 adjacent the ends 208' and 210' engage the top 312 of the cylindrical head 302 such that the head 302 is now resiliently joined and locked with linkage 200. The third length $L_3$ of the third 208 and fourth 210 legs is greater than the height of the cylindrical head 302 and in conjunction with the first length $L_1$ on the first 204 and second 206 legs is such that the cylindrical head 302 is maintained in axial alignment with opening 222 in base 202.

Mode of Operation

To initiate a parking brake application, an input force is applied to a second end of the stranded cable 304 that pulls head 302 on the brake cable 300 against base 202 of linkage 200. This force is transmitted through linkage 200 to the second loop 214 that acts on the hooked end 110 of lever 116 causing lever 116 to pivot on pin 108 and produce an expanding force in the actuator mechanism 100. The expanding force is characterized by a first force that is communicated through end 101 into web 13 and a second force that is communicated through the cam on the lever 116 into web 15. The off expanding force moves the first 12 and second 14 brake shoes toward surface 45 on drum 46 and when the friction pads 42 and 44 contact surface 45 on drum 46 frictional engagement occurs. The frictional engagement is a direct function of the input force applied to the second end of the cable 202 and is designed to hold the brake drum 46 stationary with respect to knuckle 27 of the vehicle.

When the operator desires to terminate the parking brake application, the input force applied to the second end of stranded cable 304 is terminated such that return springs 48 and 51 act on webs 13, 15 to move the friction pads 42,44 away from engagement surface 45 and return to their running clearance position.

What is claimed is:

1. In a drum-in-hat park brake assembly for a vehicle having a first brake shoe and a second brake shoe that are respectively retained on a backing plate secured to said vehicle, said first brake shoe and said second brake shoe each having a first web with a first engagement end and a second engagement end, said first engagement end of each of said first and second webs being aligned with an anchor while said second engagement end of each of said first and second webs being spaced apart by an actuator assembly, spring means attached to said first and second webs for urging said first and second webs toward said anchor and said actuator assembly, said actuator assembly upon receiving an actuation force that acts on said first engagement ends to move first and second friction members associated with said first and second brake shoes into engagement with a drum to effect a brake application, said actuator assembly being characterized by a housing having a first end that engages said first web and a second end that engages said second web, a lever that is pivotally retained in said housing and having a first end that engages said first web and a second end with a hook thereon, and linkage formed from a substantially continuous wire defined by a base with first and second parallel and adjacent legs that are located in a first plane perpendicular to said base and third and fourth parallel and adjacent legs that are located in a second plane perpendicular to said base, said first and second legs each have a first section that extend a first distance from said base to a first loop and a second section that extend a second distance from said first loop to a second loop, said third and fourth legs each extend a third distance from said base, said base having an opening defined by a complementary shape between said first leg and said third leg and said second leg and said fourth leg, said base receiving a head member on a cable after said head passes through said first loop and a force is applied to said cable to expand said first section and allow said cable to be located in said opening and said head positioned between said first and second legs and said third and fourth legs, said actuation force being communicated through said head to act on said lever by way of said second loop and effect a brake application.

2. The drum-in-hat park brake assembly as recited in claim 1 wherein said third distance is greater than a height of said head on said cable and said third and fourth legs act on said head to retain said cable in axial alignment with said opening in said base.

3. The drum-in-hat park brake assembly as recited in claim 2 wherein said third and fourth legs each have a radial projection that extends in a plane toward said first and second legs, said radial projection engaging said head to retain said head on said base.

4. The drum-in-hat park brake as recited in claim 3 wherein said first loop engages said lever to assist in maintaining said first and second legs in a plane perpendicular to said lever.

5. The drum-in-hat park brake as recited in claim 1 wherein said third and fourth legs are characterized by being joined together at said third distance to define said continuous wire and maintain a parallel relationship there between.

6. The drum-in-hat park brake as recited in claim 5 wherein said third and fourth legs are joined together by being brazed.

7. The drum-in-hat park brake as recited in claim 5 wherein said third and fourth legs are joined together by a clip.

8. The drum-in-hat park brake as recited in claim 5 wherein said third and fourth legs are joined together by being wound around each other.

9. The drum-in-hat park brake as recited in claim 6 wherein said third and fourth legs are joined together by welding.

* * * * *